Sept. 5, 1944.   G. S. LAHAM   2,357,668
SERVICE TABLE FOR MOTOR VEHICLES
Filed Nov. 13, 1942
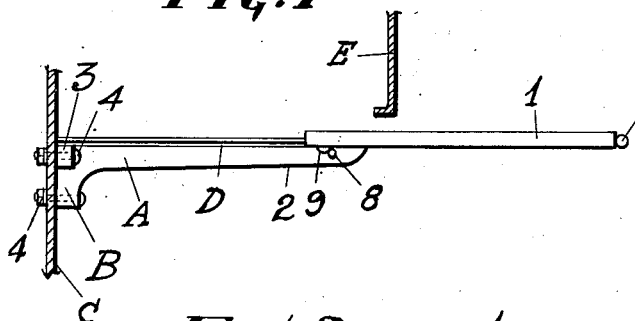
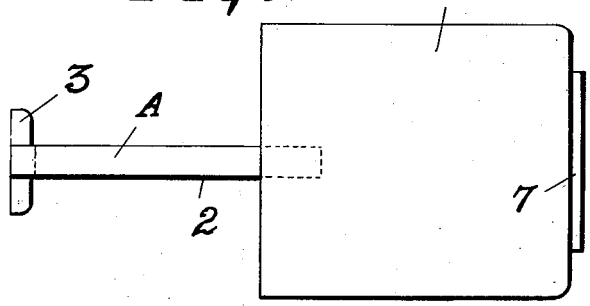
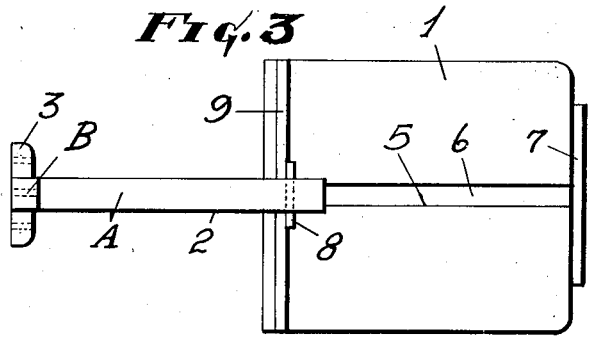
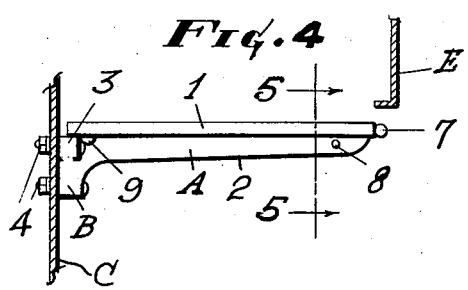
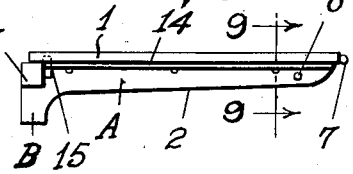
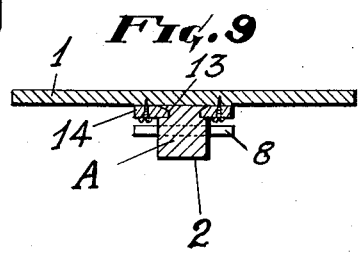
INVENTOR.
GEORGE S. LAHAM.
BY U. G. Charles, Atty.

Patented Sept. 5, 1944

2,357,668

UNITED STATES PATENT OFFICE 2,357,668

SERVICE TABLE FOR MOTOR VEHICLES

George S. Laham, Oklahoma City, Okla.

Application November 13, 1942, Serial No. 465,427

1 Claim. (Cl. 311—18)

My invention relates to a service table for motor vehicles and has for its principal object a top slidably mounted on a bracket to move inward and outward beneath the instrument board.

A further object of my invention is to provide a service table carried by a motor vehicle in such a way that its service is available at any time by drawing the table outward.

A still further object of my invention is to provide a service table available for serving confection, luncheon, or for secretarial purposes.

A still further object of this invention is to construct a table that is easily installed and without serious mutilation of any part of the vehicle should the table be removed therefrom; furthermore, said table being inexpensive to construct and may be made of wood, metal, plastic, or other suitable substances.

These and other objects will hereinafter be more fully explained, reference being had to the accompanying drawing, forming a part of this specification, wherein like characters will apply to like parts in the different views.

Referring to the drawing:

Fig. 1 is a side view of the table extended and a fragmentary portion of the vehicle to which the table is attached, said vehicle portion being in section.

Fig. 2 is a top plan view of the table with its top extended.

Fig. 3 is an inverted plan view of Fig. 2.

Fig. 4 is a side view similar to that of Fig. 1, except that the top of the table is slid to its inward concealed position.

Fig. 5 is an enlarged sectional view taken on line 5—5 in Fig. 4.

Fig. 6 is a side view of the table bracket, showing the anti-rattle spring distended upward.

Fig. 7 is a top plan view of Fig. 6.

Fig. 8 is a side view of the bracket as modified.

Fig. 9 is a sectional view taken on line 9—9 in Fig. 8.

The invention herein disclosed consists of a serving table structure comprising a top element 1, and a bracket 2 as carrying means for the top. The said bracket has an outward horizontal extending portion A and vertically disposed portion B, last said portion having a bar 3 transversely crossing the vertically disposed portion adjacent its upper extremity and extending oppositely a short distance from each side of the bracket, and each end portion of the bar being apertured to receive a bolt 4 extending therethrough and through the vertical wall of the cowl C of a motor vehicle, and a similar bolt for the lower extremity of said portion B, by which means the bracket is secured rigidly to the cowl.

The portion A of the bracket has a groove D along each side thereof adjacent its upper extremity and extending therealong to be engaged by tongues 5 oppositely positioned in a channel 6 extending through the under side of said top 1, whereby the said top is slidably carried by the bracket to be moved inward and outward from the cowl C and beneath the instrument board E as shown in Figs. 1 and 4, said top to clear the lower edge of the instrument board in its movement, and when drawn outward the top will function as a table on which to serve confection, luncheon, or for secretarial or other purposes.

Secured to the outer end of the top is a pull member 7 to be gripped by the fingers when drawing the top outward.

Removably extending through the bracket adjacent its outer end is a pin 8 to be engaged by a stop 9 that is secured to the top, by which means the top is retained against removal from the bracket but may be removed therefrom and replaced by removing the pin.

A depression 10 is positioned in the upper edge of the bracket portion A to receive a leaf spring 11 (double waved preferred) to function as an anti-rattler for the top seated on the bracket, said spring being secured by a screw 12 at one end of the spring to permit sliding movement of the other end as the waves are compressed by the top that is slidably engaged on the bracket as heretofore described, and the said spring will also function to frictionally retain the top from sliding outward as the motor vehicle is being driven.

The sliding arrangement for the top on the bracket is modified by dove tailing an upper marginal portion of the bracket as at 13 shown in Figs. 8 and 9, and having a cleat 14 to engage at each side of the bracket and secured to the top. The inner edges of the cleats are beveled to coincide with the dove tail whereby the top is retained to sliding engagement on the bracket equal to that heretofore described and including the spring, the latter not being shown in the modified arrangement. Toward the rear of the top as shown in Figs. 8 and 9 is a pin 15 to engage against pin 8 in the bracket to prevent an entire removal of the top from the bracket, and such other modifications may be employed as lie within the scope of the appended claim.

Having fully described my invention what I claim as new and desire to secure by Letters Patent is:

In a service table for motor vehicles, a bracket, right angled in form, one angle portion having means to attach the same to a cowl wall of a motor vehicle, said means to brace the bracket against rocking movement, the other angle portion of the bracket being horizontally disposed and depressed inward from its upper extremity, an arced leaf spring positioned in the depression, the vertical sides of the horizontal portion of the bracket being grooved a spaced distance downward from its upper extremity, a top rectangular in contour and having a channel extending across one side of the top to receive last named upper extremity seated in the channel, said channel having a pair of tongues oppositely positioned from each other and adapted to engage in said grooves as retaining means for the top slidable on the bracket to move toward and from the cowl wall of the motor vehicle, and stop means to restrict the outward movement of the top at a predetermined point.

GEORGE S. LAHAM.